US012748733B2

(12) United States Patent
Qiu et al.

(10) Patent No.: US 12,748,733 B2
(45) Date of Patent: Sep. 29, 2026

(54) EFFICIENT APPEND-ONLY FILE SYSTEM FOR HIGH-PERFORMANCE KEY-VALUE STORES

(71) Applicants: Lemon Inc., Grand Cayman (KY); Beijing Volcano Engine Technology Co., Ltd., Beijing (CN)

(72) Inventors: Sheng Qiu, Los Angeles, CA (US); Hao Wang, Los Angeles, CA (US); Zhengyu Yang, Los Angeles, CA (US); Yizheng Jiao, Los Angeles, CA (US); Jianyang Hu, Beijing (CN); Yang Liu, Los Angeles, CA (US); Jiaxin Ou, Beijing (CN); Huan Sun, Los Angeles, CA (US); Yinlin Zhang, Los Angeles, CA (US)

( * ) Notice: Subject to any disclaimer, the term of this patent is extended or adjusted under 35 U.S.C. 154(b) by 0 days.

(21) Appl. No.: 18/475,746

(22) Filed: Sep. 27, 2023

(65) Prior Publication Data

US 2024/0028566 A1 Jan. 25, 2024

(51) Int. Cl.
*G06F 16/18* (2019.01)
*G06F 11/14* (2026.01)
*G06F 16/178* (2019.01)

(52) U.S. Cl.
CPC ...... *G06F 16/1815* (2019.01); *G06F 11/1407* (2013.01); *G06F 16/178* (2019.01); *G06F 16/1847* (2019.01)

(58) Field of Classification Search
CPC ............. G06F 16/1815; G06F 11/1407; G06F 16/178; G06F 16/1847
See application file for complete search history.

(56) References Cited

U.S. PATENT DOCUMENTS

| | | | | |
|---|---|---|---|---|
| 5,872,800 | A * | 2/1999 | Glover ............... | G11B 20/1833 714/766 |
| 6,021,408 | A * | 2/2000 | Ledain .................... | G06F 16/10 707/823 |
| 7,631,009 | B1 * | 12/2009 | Patel .................. | G06F 11/1004 707/999.102 |
| 9,697,219 | B1 * | 7/2017 | Wang ................. | G06F 16/1734 |
| 2015/0120656 | A1 * | 4/2015 | Ramnarayanan ... | G06F 16/1744 707/616 |
| 2016/0110408 | A1 * | 4/2016 | Madhavarapu ..... | G06F 16/2358 707/615 |
| 2019/0005262 | A1 * | 1/2019 | Surla ..................... | H04L 9/0662 |
| 2023/0053087 | A1 * | 2/2023 | Jakkula ................. | G06F 3/0611 |

(Continued)

OTHER PUBLICATIONS

Ousterhout et al. Beating the I/O bottleneck: a case for log-structured file systems. ACM SIGOPS Operating Systems Review, 23:1, 1989. pp. 11-28. (Year: 1989).*

(Continued)

*Primary Examiner* — Angelica Ruiz
(74) *Attorney, Agent, or Firm* — Fish & Richardson P.C.

(57) ABSTRACT

A file system particular for use with key-value stores is provided. The file system can operate in a user space instead of a kernel space. The file system can be an append-only file system. The file system can support use of solid state drives (SSDs) for storage, including zoned SSDs. The file system can include a file manager, a metadata manager, a task scheduler, a space allocator, and a collaborator for collaborating with a key-value store.

18 Claims, 13 Drawing Sheets

(56) References Cited

U.S. PATENT DOCUMENTS

| | | | | |
|---|---|---|---|---|
| 2023/0195622 | A1* | 6/2023 | Vavilapalli .......... | G06F 12/0802 711/118 |
| 2023/0237024 | A1 | 7/2023 | Nuttle | |

OTHER PUBLICATIONS

Aether et al. A Scalable Approach to Logging. VLDB Endowment, 3:1, 2010, pp. 681-692. (Year: 2010).*

Bjorling. Zoned Namespaces (ZNS) SSDs: Disrupting the Storage Industry. SDC 2020, pp. 1-3. (Year: 2020).*

Chen et al. FlatStore: An Efficient Log-Structured Key-Value Storage Engine for Persistent Memory. ASPLOS'20, pp. 1077-1091. (Year: 2020).*

What Is A Superblock on Linux? Jul. 2023, pp. 1-15. https://www.iseepassword.com/blog/what-is-a-superblock-on-linux/ (Year: 2023).*

Superblock Definition 2005, pp. 1-2. https://www.linfo.org/superblock. (Year: 2005).*

Aghayev Abutalib., "Adopting Zoned Storage in Distributed Storage Systems", Thesis, Aug. 2020, XP055866890, University of Wisconsin-Madison, pp. 1-143, Retrieved from the Internet: URL: http://reports-archive.adm.cs.cmu.edu/anon/2020/CMU-CS-20-130.pdf.

Extended European Search Report for European Application No. 24191018.1, mailed Jan. 7, 2025, 10 pages.

* cited by examiner

EFFICIENT APPEND-ONLY FILE SYSTEM FOR HIGH-PERFORMANCE KEY-VALUE STORES

FIELD

This disclosure is directed to file systems, particularly for use with key-value stores.

BACKGROUND

Key-value stores are commonly used as local storage engines for various infrastructural storage systems. A key-value store typically keeps its persistent data on disks through a file system. These file systems are general purpose, and include many features and structures that are not suited for the particular requirements of key-value stores.

SUMMARY

This disclosure is directed to file systems, particularly for use with key-value stores.

By providing a specialized file system configured for use with key-value stores, tail latency and write amplification can be reduced. Further, storage costs can be reduced and the potential number of files and/or amount of data that can be lost in failures can be limited, improving system robustness. Additionally, the file system, by being co-designed with and specialized for the workload of key-value stores, can control metadata overhead and make this overhead more predictable. Further, the file system can have operations, particularly input/output (I/O) patterns selected to be suitable for the storage devices used. Additionally, by having the file system operate in a user space instead of a kernel space, I/O scheduling can be set up so as to be friendly to flash memories, allowing use of NVMe solid state drives (SSDs) and/or ZNS SSDs, which offer zoned storage.

In an embodiment, a file system is configured to perform log-structured append-only write operations. The file system is configured for use with a key-value store, the file system comprising a file manager configured to maintain separation of data and logs.

In an embodiment, the file manager is further configured to determine whether a file is a general file or an instant file based on write characteristics of said file, and when the file is a general file, to store the general file in one or more pre-allocated data spaces. In an embodiment, the one or more pre-allocated data spaces are each approximately one megabyte (MB) in size.

In an embodiment, the file system further includes a metadata manager configured to perform compaction of a journal file, the journal file containing persistent metadata of the file system. In an embodiment, the compaction of the journal file is performed in a synchronous mode, wherein in the synchronous mode, a global flushing lock is maintained until a compacted journal and updates to a superblock are completed. In an embodiment, the compaction of the journal file is performed in an asynchronous mode, wherein in the asynchronous mode, a global flushing lock is released once in-memory metadata dump requests are submitted.

In an embodiment, the file system further includes a task scheduler configured to assign a priority to each write task, the priority based on whether the data of the write task is general data or instant data.

In an embodiment, the file system includes a dedicated journaling thread configured to generate a journal, wherein the journal includes a most recent checkpoint from an operation log of the file system. In an embodiment, the journal includes one or more transactions, each of the one or more transactions including a universal unique identifier, a global sequence identifier, an encoded operation log entry, and a cyclic redundancy check.

In an embodiment, a disk layout of the file system includes a superblock, the superblock including journal index node content, universal unique identifier data, version information, and block size. In an embodiment, the disk layout provides the superblock at a second 4 kilobyte block provided in a storage device.

In an embodiment, data storage of the file system includes one or more zoned state drives (ZNS SSDs).

In an embodiment, a system includes a key-value store and the file system as described herein.

In an embodiment, the file system is configured to update data based on the key-value store without updating metadata associated with said data.

In an embodiment, a system includes a key-value store and file system collaborator configured to provide an interface between the key-value store and the file system. In an embodiment, the key-value store and file system collaborator is configured to expose an application programming interface allowing the key-value store to mark priority of input/output requests to the file system. In an embodiment, the key-value store and file system collaborator is configured to coordinate compaction and/or garbage collection operations between the key-value store and the file system. In an embodiment, the key-value store and file system collaborator is configured to provide data from the key-value store to the file system to achieve sector-level redundancy for the file data of the key-value store in the file system. In an embodiment, the key-value store and file system collaborator is configured to perform sync operations for the key-value store and the file system without requiring syncing of metadata.

In an embodiment, the file system is an append-only file system. In an embodiment, the file system is configured to write said separate data and logs to persistent memory independently.

In an embodiment, a database system includes a key-value store, a file system configured to perform append operations, the file system configured for use with a key-value store, and a key-value store and file system collaborator configured to provide an interface between the key-value store and the file system. The file system comprises a file manager configured to maintain separation of data and logs. In an embodiment, the key-value store and file system collaborator is configured to expose an application programming interface allowing the key-value store to mark priority of input/output requests to the file system.

In an embodiment, a computer-readable medium contains instructions that, when executed by a processor, direct the establishment and operation of a file system, the file system configured to perform append operations, the file system configured for use with a key-value store, wherein the file system comprises a file manager configured to maintain separation of data and logs.

DRAWINGS

DETAILED DESCRIPTION

Figure 1:
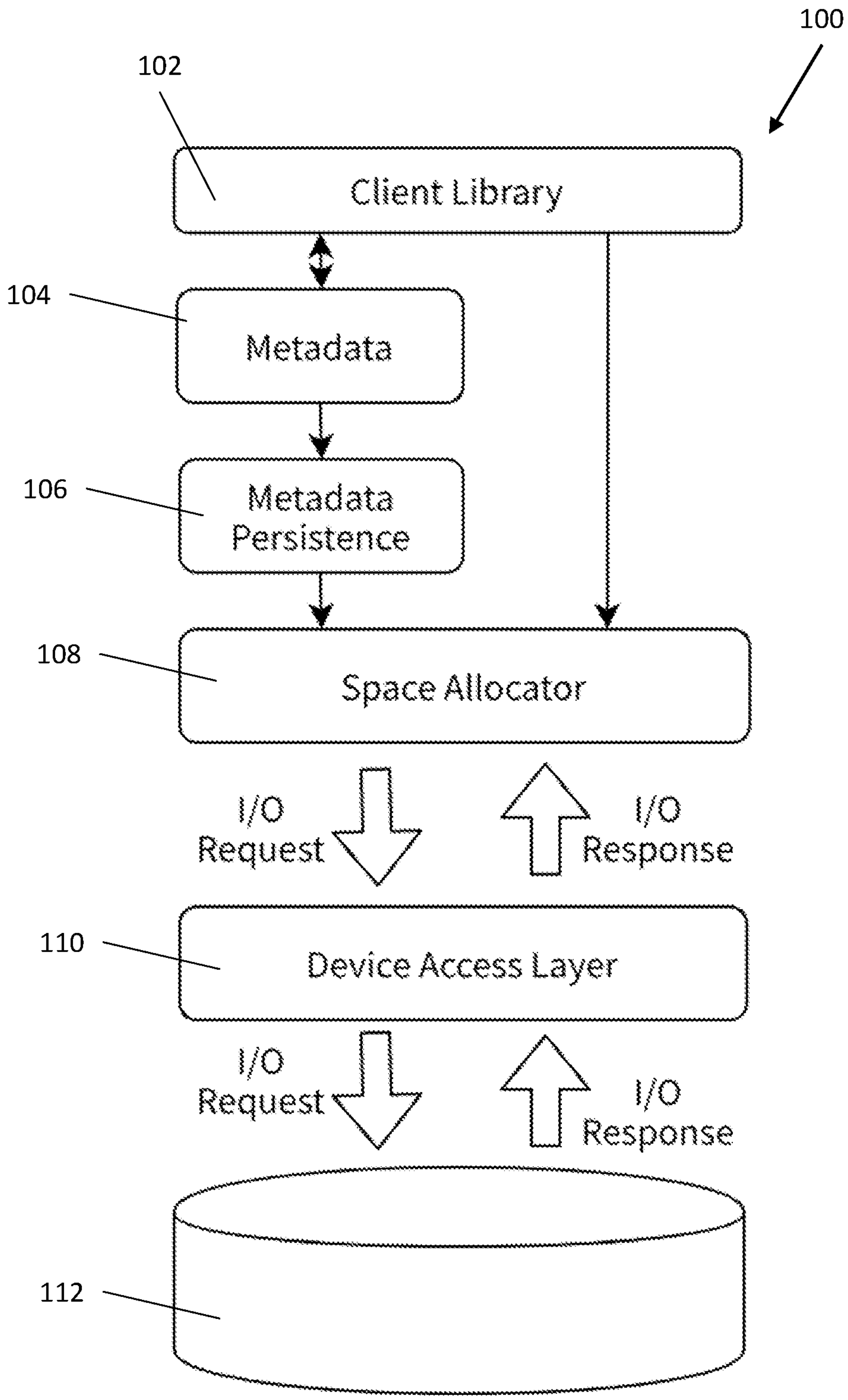
FIG. 1 shows an architecture of a file system according to an embodiment.

This disclosure is directed to file systems, particularly for use with key-value stores.

In the following detailed description, reference is made to the accompanying drawings, which form a part of the description. In the drawings, similar symbols typically identify similar components, unless context dictates otherwise. Furthermore, unless otherwise noted, the description of a successive drawing may reference features from any previous drawing to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described and recited herein, as well as illustrated in the drawings, may be arranged, substituted, combined, separated, and designed in a wide variety of different configurations, all of which are explicitly contemplated herein.

Additionally, portions of the present disclosure may be described herein in terms of functional block components and various processing steps. It should be appreciated that such functional blocks may be realized by any number of firmware, software, and/or hardware components configured to perform the specified functions.

FIG. 1 shows an architecture of a file system according to an embodiment. File system 100 includes client library 102, metadata 104, metadata persistence 106, space allocator 108, and device access layer 110 configured to interface with storage device 112.

File system 100 can be designed specifically to support key-value store workloads, without the burden to support general-purpose file system workload. File system 100 can be a user-space append-only file system designed to operate as the file system for a corresponding key-value store. In an embodiment, storage device 112 used in the file system 100 can be solid state drives (SSDs), for example, NVMe SSDs. Device access layer 110 can be provided to implement file system 100 on the storage device 112. File system 100 can be configured to reduce sync write latency typically encountered in key-value stores. File system 100 can include customized handling of metadata 104 and making metadata persistent 106. For example, file system 100 can carry out sequential writes for write-ahead log (WAL) and SST files from the corresponding key-value system. File system 100 can further provide an ordered journaling mode, instead of dedicating a separate thread and thus requiring multiple metadata writes for journaling commit blocks. A dedicated journaling thread can lead to significant write amplification, especially for small data sizes (4 KB-32 KB), which can be avoided by the ordered journaling mode of file system 100. Reducing or avoiding write amplification can improve tail latency, particularly for sync writes of the write-ahead log.

In file system 100, the data and logs can be split. Further, the write model used in file system 100 can be log-structured append-only writing. File system 100 can use pre-allocated chunks of space for the storage of general data, such that sync writes can be performed by writing data without requiring a corresponding update to metadata. Further, data persistence for files and logs can be performed separately. Performing these tasks separately can reduce the number of metadata persistence operations associated with data write operations.

File system 100 can be configured to be an append-only file system, where random-writes are not allowed. Random writes much more expensive to support than appending writes (e.g., implementing atomic random writes typically requires data journaling besides metadata journaling, which effectively doubles the amount of data written), and further can be unfriendly to NAND flash media. On conventional SSDs, random writes could require extensive garbage collection overhead, and such operations cannot be performed on zoned (ZNS) SSDs. File system 100 can be configured to perform append operations, appending data to files. Since key-value stores do not require random writes, the file system 100 can be designed as append-only in an embodiment, for example by having the file system 100 not allow rename, delete, or modify operations. File system 100 can utilize ZNS SSDs, thereby reducing storage costs significantly. In some embodiments, file system 100 can also optionally be used with hard disk drives (HDDs) such as shingled magnetic recording (SMR) HDDs serving as the storage.

File system 100 can keep file system metadata 104 in memory during normal operation. Storing metadata 104 in memory when possible reduces latency during reads and allows writes to require only a single I/O operation.

File system 100 can provides consistent high throughput and low (tail) latency for sequential writes and random/sequential reads. File system 100 can be suitable to support online services such as key-value stores and databases.

File system 100 can be configured to cater to both general files and instant files. General files can be characterized by low write-intensity and exhibit low latency in sequential and random reads. As one non-limiting example, key-value store SST files, which can be written in batches without the need for frequent disk flushing, would be treated as general files by file system 100. Instant files can be characterized by requiring fast, incremental synchronous writes while also requiring high sequential and random read performance. For example, write-ahead log (WAL) files in a key-value store require frequent disk flushing for instant durability, leading to their designation as instant files in the file system 100.

Figure 2:
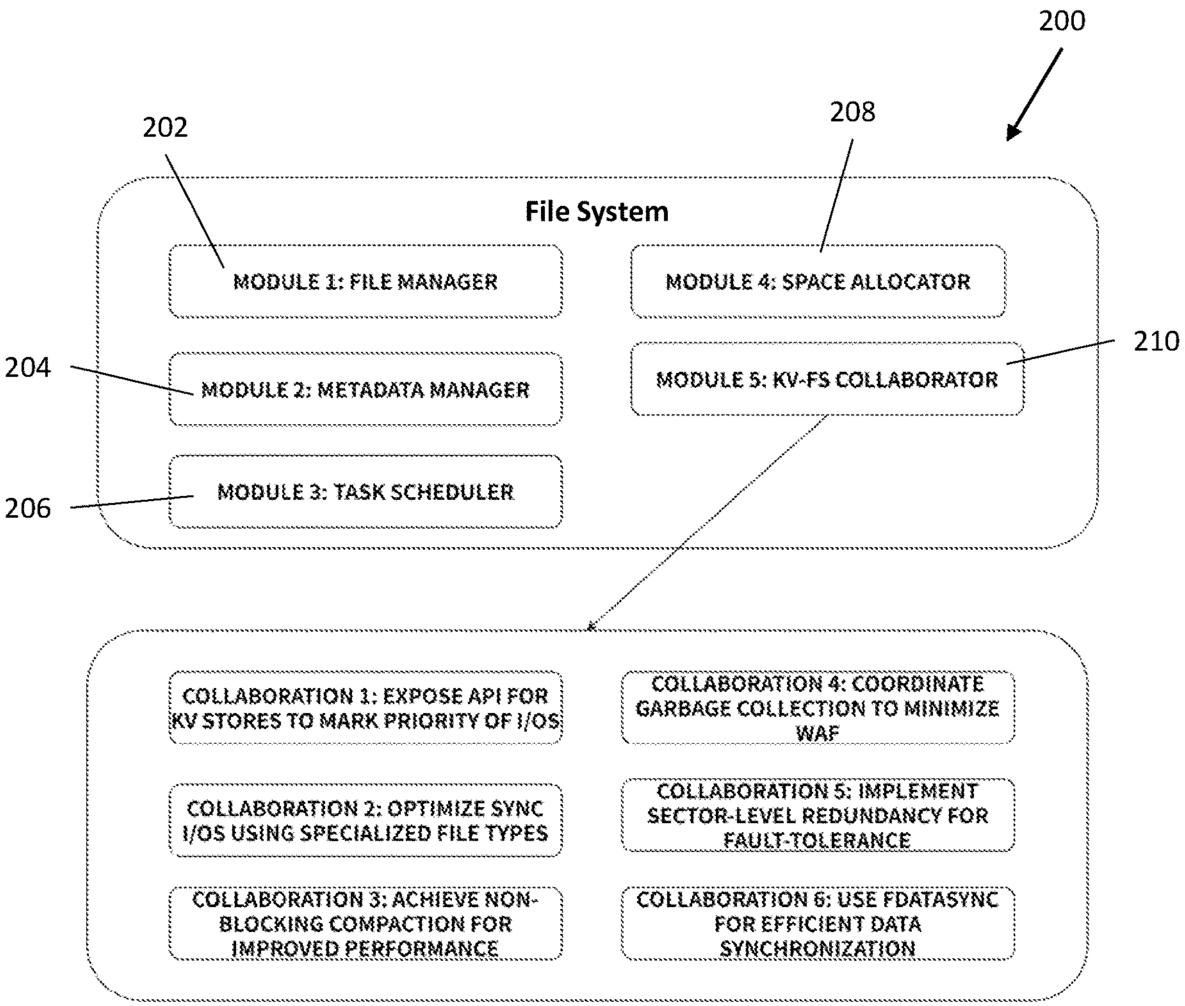
FIG. 2 shows modules of a file system according to an embodiment.

File system 100 can be accessed through dedicated client library 102. The client library 102 can provide API interfaces for creating, deleting, renaming, reading and/or writing files FIG. 2 shows modules of a file system according to an embodiment. File system 200 includes file manager 202, metadata manager 204, task scheduler 206, space allocator 208, and key-value file system collaborator 210.

File manager 202 is configured to carry out data placement so as to improve file system performance by reducing sync write overhead. The sync write overhead can be reduced through separation of data and logs, pre-allocating data space, and/or maintaining independence between data and log persistence. By segregating data and logs and adopting a log-structured append-only writing approach, the write model of file system 200 can be improved, thereby leading to enhanced performance. File manager 202 can improve efficiency for sync writes by incorporating pre-allocated data space, as only data persistence is required, eliminating the need for persisting metadata, and thereby reducing overhead. By providing separate data persistence for different files and global log persistence, these operations can be executed independently, thereby mitigating the extensive metadata persistence operations typically caused by single data write persistence in traditional file systems.

The file manager 202 can be configured to handle general files and instant files, as discussed above. The general files can be characterized by relatively low write intensity, and the instant files can be files that required fast, incremental synchronous writes. The pre-allocating of data space can include allocating chunks of discrete size for the storage of general files, allowing more efficient metadata to be used for such general files. The nature of files as general files or instant files can be determined by file manager 202. The nature of files as general files or instant files can be determined based on an API through which the files have been provided or accessed. The nature of files as general files or instant files can be determined based on a tag applied to the file.

Metadata manager 204 is configured to manages file system metadata in memory and on disk. Metadata manger 204 can be configured to carry out journal compaction to release disk space occupied by stale records and prepare the journal for later metadata updates. A non-limiting example of the journal compaction process carried out by metadata manager 204 is provided in FIG. 8 and described below.

Task scheduler 206 is configured to manage data reading and writing processes. Task scheduler 206 can categorize the writes by task type, such as the writing of instant data or general data, and to schedule the data writes according to priorities based on the type of task. In an embodiment, metadata writes can be sent directly to be performed, without having to be scheduled by task scheduler 206.

Space allocator 208 is configured to manage space within file system 200. In an embodiment, space allocator 208 is configured to use three layers (L0, L1, L2) to describe the spaces. Space allocator 208 can thereby accelerate the determination of the status of spaces as clear or set, without adding excessive overhead. A non-limiting example of the structure implemented by space allocator 208 is provided in FIG. 10 and described below.

Key-value-file system collaborator 210 is configured to interface with an associated file system to improve the operations of the key-value system and the file system 200 by coordinating operations in both systems. Collaborations between the key-value system and the file system that are facilitated by key-value-file system collaborator 210 can include, as non-limiting examples, exposing an API allowing the key-value store to mark priority of I/O requests, providing specialized file types to improve synchronization I/O, reducing or avoiding blocking resulting from compaction operations, coordinating garbage collection operations to reduce write amplification, providing sector-level redundancy for stored data to improve fault tolerance, and performing sync operations without requiring syncing of metadata.

The key-value and file system collaboration can enable a more efficient approach compared to conventional file sync and file data-sync implementations. When such conventional file sync and file data-sync approaches are used with an append-only file, two separate I/O operations are triggered: one for updating the data and another for updating the file size. This results in increased input/output overhead and Write Amplification Factor (WAF). The key-value and file system collaboration can allow a specialized file data sync system call that updates only the user data, without synchronizing the file size unless a new unit of general file storage is allocated for the file to accommodate the new user data. This can avoid unnecessary synchronization of file metadata in most cases. Accordingly, the file data sync implementation through the key-value and file system collaboration can avoid performing the extra I/O operation caused by traditional file sync and file data sync, effectively reducing the overall WAF by 1. This can provide improved performance and enhanced data consistency without compromising essential synchronization tasks.

Figure 3:
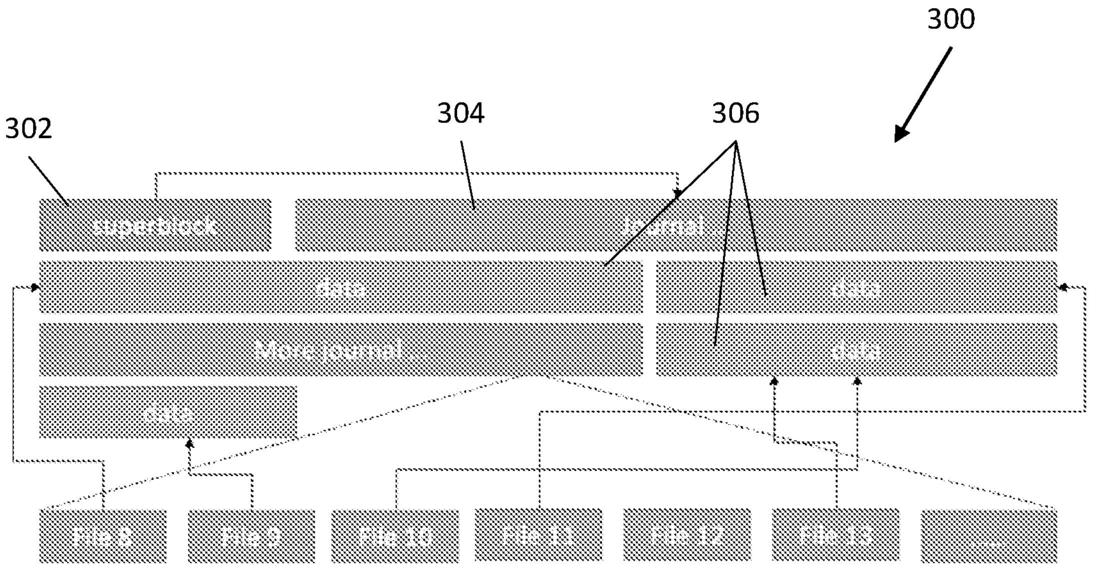
FIG. 3 shows a disk layout for a file system according to an embodiment.

FIG. 3 shows a disk layout for a file system according to an embodiment The disk layout 300 includes three distinct types of data: superblock 302, journal 304, and data 306. Superblock 302 includes essential global file system metadata, including journal index node (inode) content, universal unique identifier (UUID) data, version information, block size, and other pertinent parameters. In an embodiment, superblock 302 is located at the second 4 KB of the storage device, with the positioning of superblock 302 being selected to improve accessibility and coordination with other data components. Journal 304 is data capturing a most recent checkpoint from an operation log of the file system. The journal 304 can be effectively replayed during the file system's mount process, improving the process of recovery for the in-memory file metadata. Lastly, the data 306 is dedicated to storing the actual content of individual files within the file system. In an embodiment, each data block is organized as a contiguous range of Logical Block Addresses (LBAs).

Figure 4:
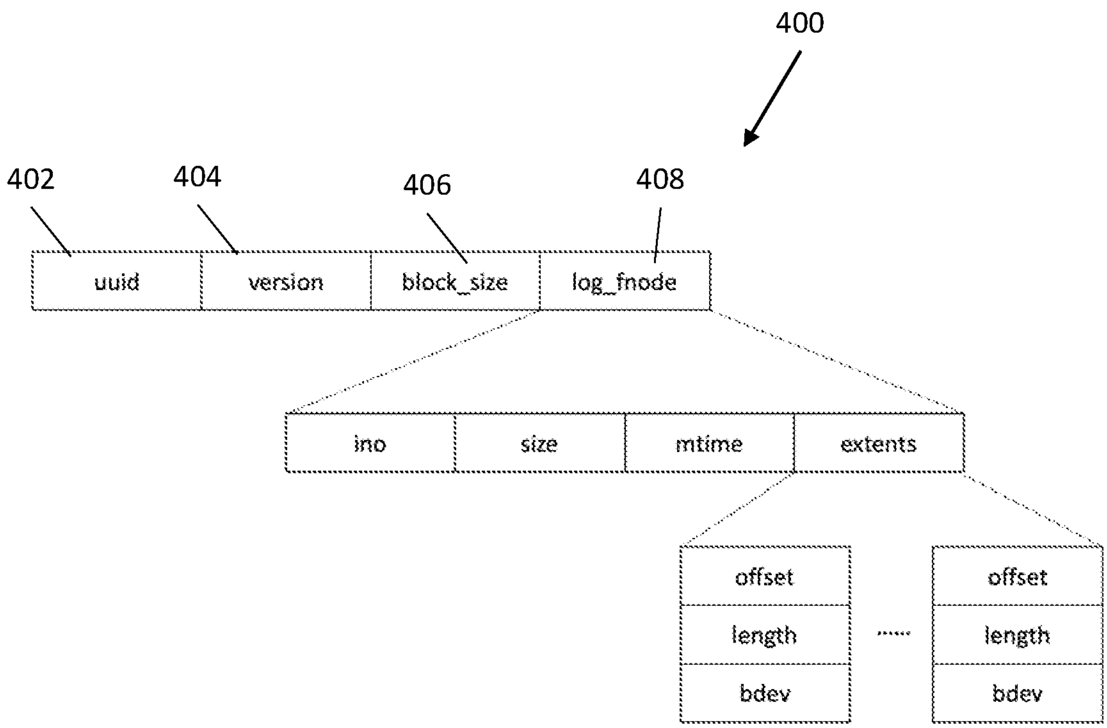
FIG. 4 shows a superblock of a file system according to an embodiment.

FIG. 4 shows a superblock of a file system according to an embodiment. Superblock 400 can include file system metadata and define the file system type, size, status, and information about other metadata structures (metadata of metadata). The superblock 400 can provide a high level metadata structure for the file system. The superblock 400 includes UUID 402, version information 404, block size 406, and log file node data 408. UUID 402 can be a repository for a unique and globally-recognized identifier, which uniquely identifies the particular instance of the file system. The UUID 402 can ensure that each file system instance remains distinguishable from others, thereby preventing conflicts and enabling efficient management and tracking of individual file systems. Version information 404 signifies a version number of the file system. The version number can be incremented solely following the execution of a journal compaction operation, thus tracking the developmental stages and enhancements to the file system. Accordingly, version information 404 can be used to aid in compatibility management and version control. Block size 406 represents the size of the file system. Block size 406 can function as a minimum size for read and write Input/Output (TO) requests within the file system. Block size 406 can thereby support effective and efficient data handling, optimizing data transfer and management operations within the file system. Log file node data 408 can be dedicated to the journal. The log file node data 408 can contain information including file inode number, file size, last modification time, and a list of discrete chunks for general file data. Each chunk within the list denotes a sequential range of Logical Block Addresses (LBAs) on the device. The LBAs can be represented as <offset, len, dev_identifier> in the log file node data 408. The dev_identifier specifies the type of device, thus allowing support for multiple devices. The support for different devices can facilitate the storage of metadata and data across different device types, thereby enhancing scalability and flexibility. Additionally, supporting multiple storage devices per server can reduce the management overhead of applications. The superblock 400 can thereby provide improved data management, seamless version control, and adaptability to diverse hardware configurations.

Figure 5:
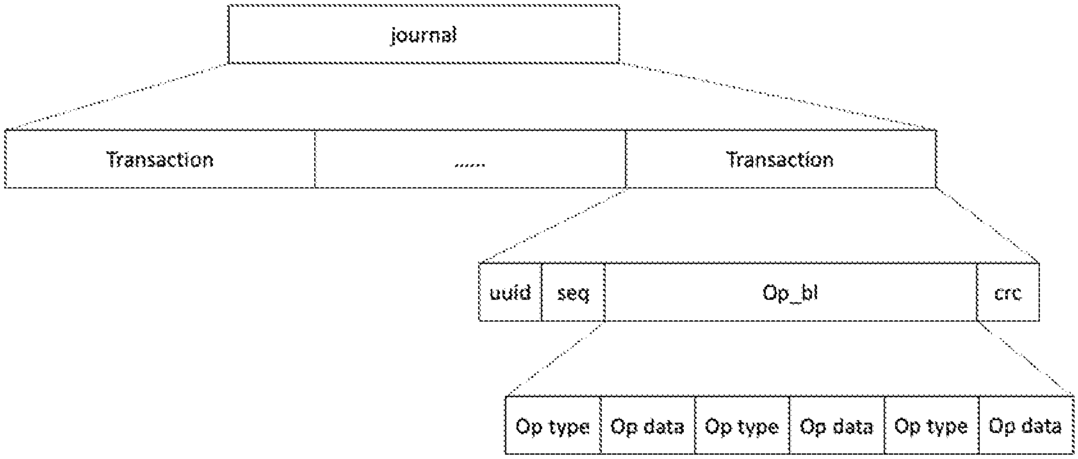
FIG. 5 shows a journal of a file system according to an embodiment.
Figure 6:
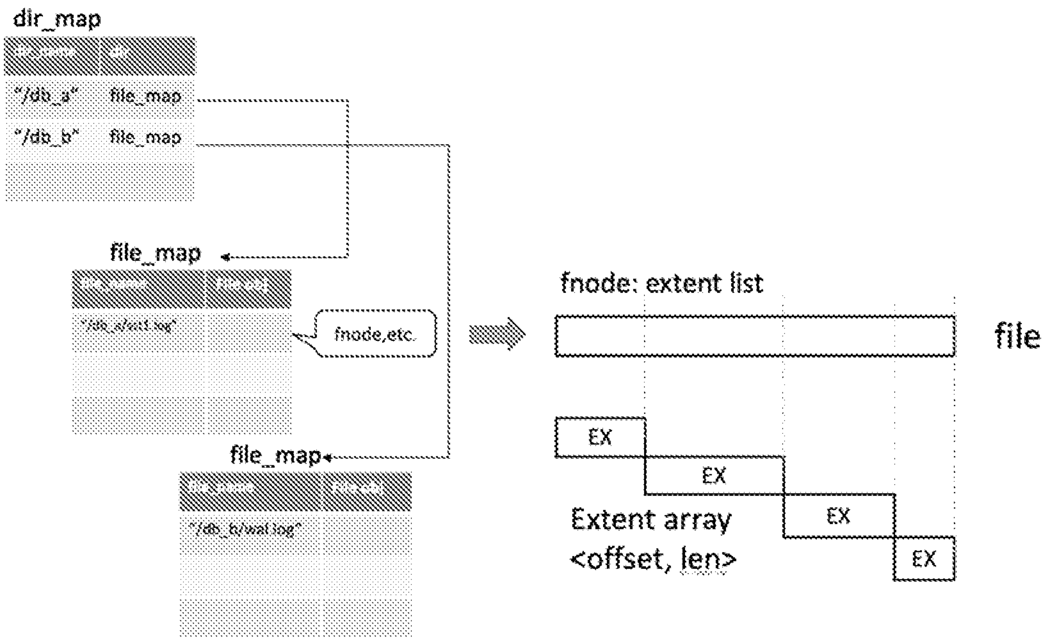
FIG. 6 shows directory and file management in a file system according to an embodiment.

FIG. 5 shows a journal file of a file system according to an embodiment. The journal file as shown in FIG. 5 is a log configured to durably store metadata of the file system to a disk to make said metadata persistent. Upon mounting of the file system, the journal can be utilized to recover in-memory metadata. The journal is composed of transactions of an operation log. The format of the transaction entry is shown in FIG. 6. The UUID represents the UUID of the file system that owns this transaction. The "seq" is the unique and global sequence identifier used by the transaction. The "op_bl" is the encoded operation log entries. The "crc" is a cyclic redundancy check for the transaction content, which can be used to verify the correctness when reading the transaction content during filesystem recovery. Operation log entries can include, as non-limiting examples, recording of a new file node, linking files to directory data, update file nodes, linking files to existing directories, unlinking files from existing directories, creating directories, deleting directories, updating a file node for example through creating or appending files, deleting a file, recording journal information during compaction, and/or recording transaction sequence identifiers during compaction.

In the file system, the metadata manager such as metadata manager 202 described above and shown in FIG. 2 can manage file system metadata both in memory and on disk. The metadata manager can handle journal compaction, to release disk space occupied by journal records that have become stale. The metadata manager can update metadata when changes are made. FIG. 6 shows directory and file management in a file system according to an embodiment. As shown in FIG. 6, "dir_map" provides a hash map associating directory names and their corresponding "file_map." As shown in FIG. 6, the "file map" can manage all the "fnodes" of files located within a specific directory. Each fnode maintains the mapping of file blocks to their respective physical disk locations, organized as a list of discrete chunks used for the general data.

The metadata organized according to FIG. 6 can be utilized as follows. When provided with a file name, the file system can promptly locate the associated fnode, providing seamless file access. Furthermore, with the provision of the requested file offset and length, the file system can rapidly determine the Logical Block Address (LBA) of the pertinent chunk used for general data. Notably, all metadata lookup operations can be performed in memory, ensuring expeditious retrieval of critical metadata information within the file system. This memory-centric approach enhances the overall performance and reliability of the file system.

Figure 7:
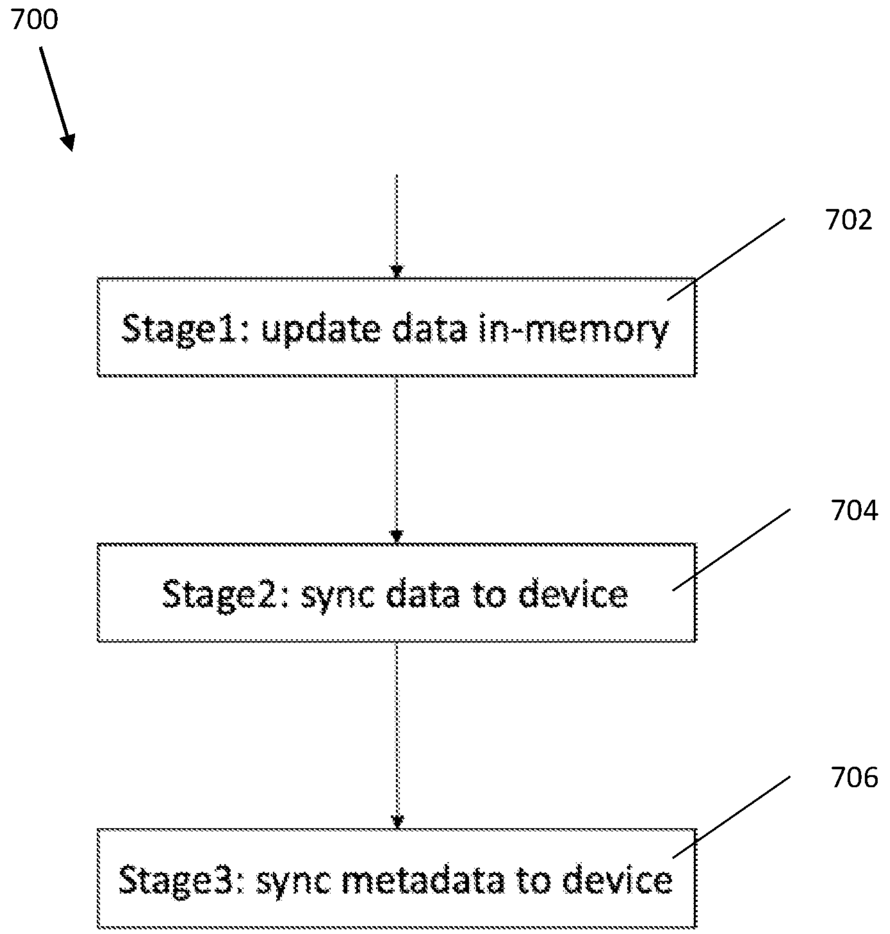
FIG. 7 shows a method of making metadata persistent in a file system according to an embodiment.

FIG. 7 shows a method of making metadata persistent in a file system according to an embodiment. Method 700 includes updating data in-memory 702, syncing data to a device 704, and syncing metadata to the device 706. Updating data in-memory at 702 includes using an operation to append data to the file's internal write buffer. As data is appended, the system checks if the write buffer's length has reached the designated threshold, with a non-limiting example of such a threshold being 512 KB. If the threshold is met, the data is flushed to the storage device. The data can be flushed to the storage device by syncing the data to the device at 704. Syncing the data to the device at 704 can include performing a flush operation, in which data in the write buffer is written to the storage device. Additionally, syncing the data to the device at 704 can include marking of the file and adding said file to a global marked file list, indicating that the file has pending changes. Further, the metadata can be synced to device at 706. The syncing of the metadata to the device at 706 can be performed by calling a function for ensuring data persistence. The function can force the write of the file's internal write buffer to the storage device, making sure that the data is securely stored. The function can be an "fsync( )" function. In an embodiment, all marked records marked during syncing of data to the device at 704, subsequent to the last syncing of log data can be synchronized to the journal file on the device. This step helps maintain the durability and consistency of file metadata changes in various computing environments. Additionally, at the syncing of the metadata to the device at 706, transaction records for the marked files can be updated. The transaction records can be formatted as described in the preceding section and subsequently flushed to the journal file. This process can ensure the durability and consistency of file metadata changes, enhancing the reliability and performance of the key-value store and file system in various computing environments.

Figure 8:
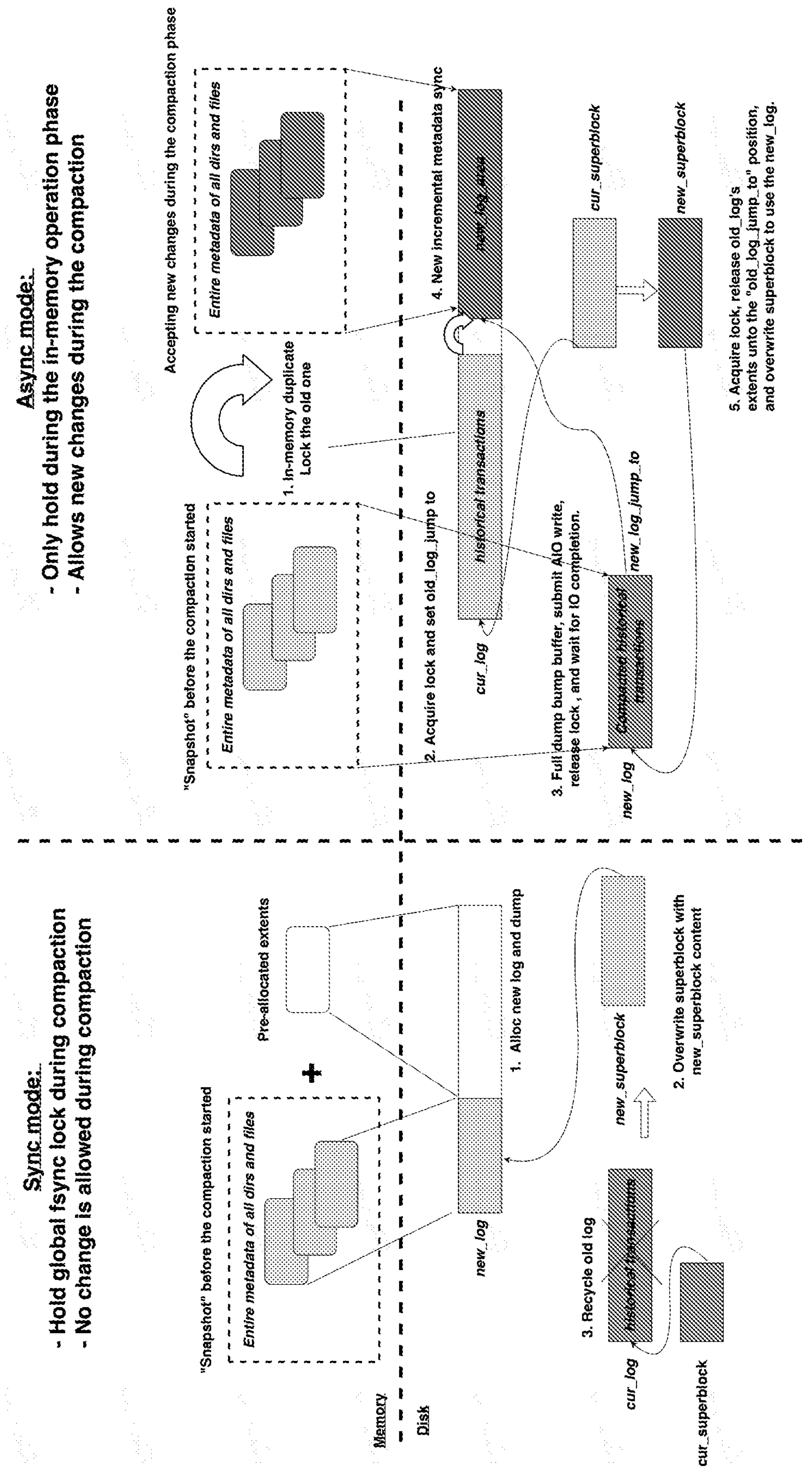
FIG. 8 shows journal file compaction in a file system according to an embodiment.

FIG. 8 shows journal file compaction in a file system according to an embodiment. File systems may accumulate stale records that could potentially be updated by subsequent metadata changes, leading to an ever-increasing journal size. To address this issue, it becomes necessary to release the disk space occupied by the stale records and perform a journal file compaction, for example according to FIG. 8. This process can be carried out in either synchronous or asynchronous mode, each having distinct characteristics. In synchronous mode, the file system can maintain a global flushing lock until a new compacted journal and updates to the superblock are completed. This can ensure that the compaction operation is performed in a coordinated manner, guaranteeing data integrity. Conversely, in the asynchronous mode, the file system can release the flushing lock once in-memory metadata dump requests are submitted to the device. This allows the data flush to disk to continue unimpeded while the file system concurrently submits metadata update transaction records to disk. By adopting the asynchronous mode, unnecessary delays caused by waiting for disk I/O completion can be minimized, improving overall system efficiency. These compaction modes can allow the file system to effectively manage journal size and thereby improve performance.

Figure 9:
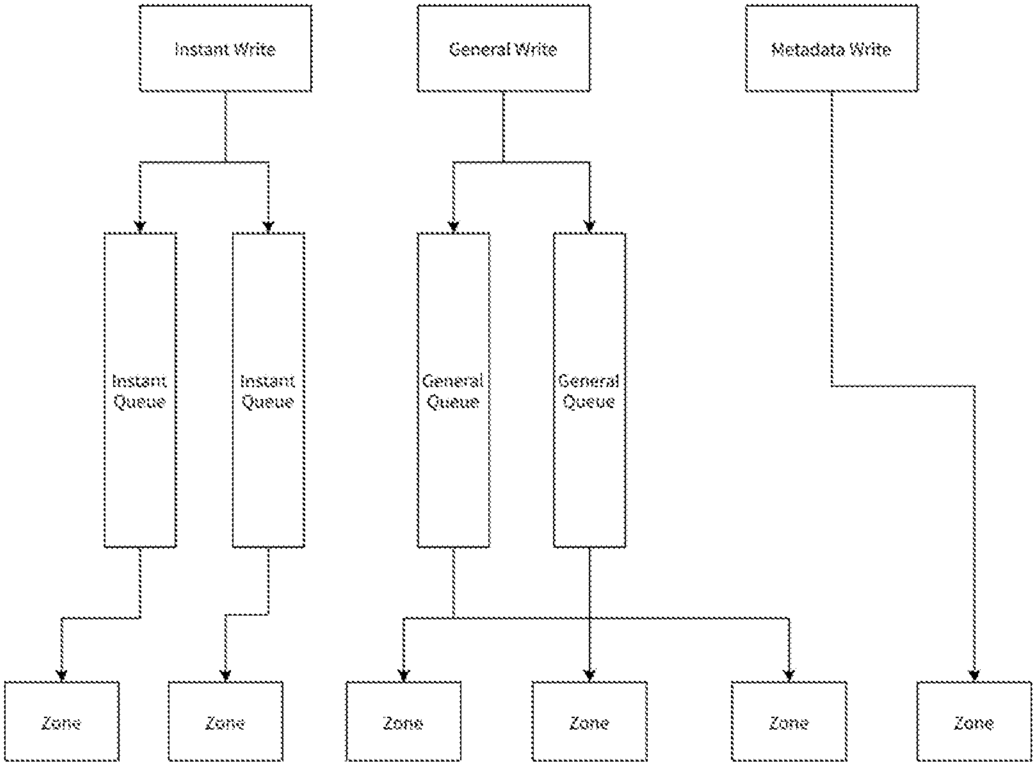
FIG. 9 shows task scheduling in a file system according to an embodiment.

FIG. 9 shows task scheduling in a file system according to an embodiment. The task scheduler is configured to manage data reading and writing operations of the file system. In an embodiment, all data reading and writing operations of the file system are managed by the task scheduler. For write operations, each write task can be scheduled with a particular priority based on the type of data involved in the operation, such as instant data or general data. Metadata writes can be directly sent to the zone manager without task scheduling. Accordingly, in such an embodiment, there can be three categories of write operations, “instant write,” “general write,” and “metadata write.” A further role of “polling worker” can also be provided in such embodiments. For instant writes, each instant file can be bounded to a separate zone along with an instant queue. For general writes, each general write can be assigned to any available general queue. The polling worker task can dispatch the general data to any available zone, or preferably append the general data being written to general data of same file or tag hint. For metadata writes, the metadata writes are directed to the metadata zone. The file system can prioritize immediate and secure storage of metadata information to maintain the integrity of file structures and system operation. By directly sending metadata writes to the metadata zone, the system can ensure that critical file system information is promptly updated and available for retrieval. The polling worker can use a single thread for directing the flushing of data. This single-threaded approach handles all queues, efficiently flushing their respective data. This consolidated approach can simplify the management and coordination of data flushing operations, reducing unnecessary overhead and promoting seamless file management. The use of a single polling thread ensures optimal utilization of system resources, leading to improved performance and responsiveness in the file management system.

Figure 10:
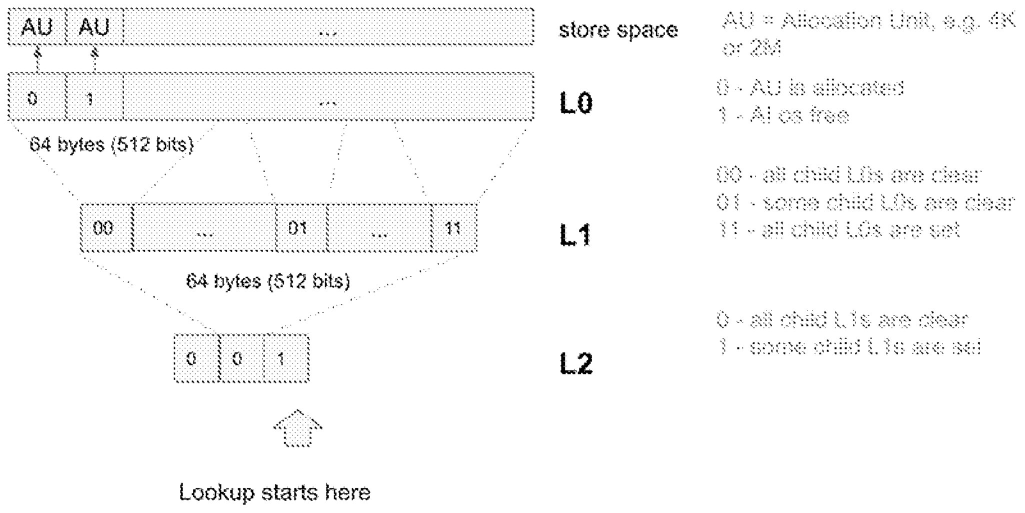
FIG. 10 shows memory allocation in a file system according to an embodiment.

FIG. 10 shows memory allocation in a file system according to an embodiment. In the allocation shown in FIG. 10, three hierarchical layers L0, L1, and L2 are used. The lowest layer is L0 that stores the status of individual allocation unit (AU). The AU is matched with the block size of the file system, for example, 4 KB or 2 MB, which is determined during when making the file system on one or more storage devices. L0 uses one bit to indicate the status of each AU, with the one bit being 0 meaning that the AU is allocated and 1 meaning that the AU is free. L1 groups the AUs in L0 to groups of 512, which is aligned to a CPU cache line size (64 bytes), thereby facilitating searching. In L1, every two bits represent the status of 512 AUs status in L0. In this, the two bits being 00 means all child L0 AU are clear, the two bits being 01 mean some child L0 AUs are clear, and the two bits being 11 means all child L0 AU are set. In L2, every bit represents the status of slot 512 in L1, with the bit being 0 meaning all children in L1 are clear, and the bit being 1 meaning some of the children in L1 are set. Since most memory consumption is still caused by L0, this three-layer approach contributes low additional overhead while improving over a flat bitmap system.

In an embodiment, the file system can include an API for allowing the key-value store to set I/O priorities, for example as part of key-value-file system collaborator 210 as shown in FIG. 2 and discussed above. The collaboration between the key-value store and the file system regarding I/O priorities can reduce tail latency by implementing a user-space I/O scheduler that assigns high priority to foreground I/O tasks and low priority to background I/O tasks. Additionally, the key-value stores can employ a scheduler for background tasks, ensuring consistent I/O amplification and latency for upper-layer applications, resulting in stable and low tail latency. Furthermore, reading general files of the file system requires no metadata I/O, due to the use of the storage segments having discrete size, thus allowing most reads to only require a single I/O operation.

Figure 11:
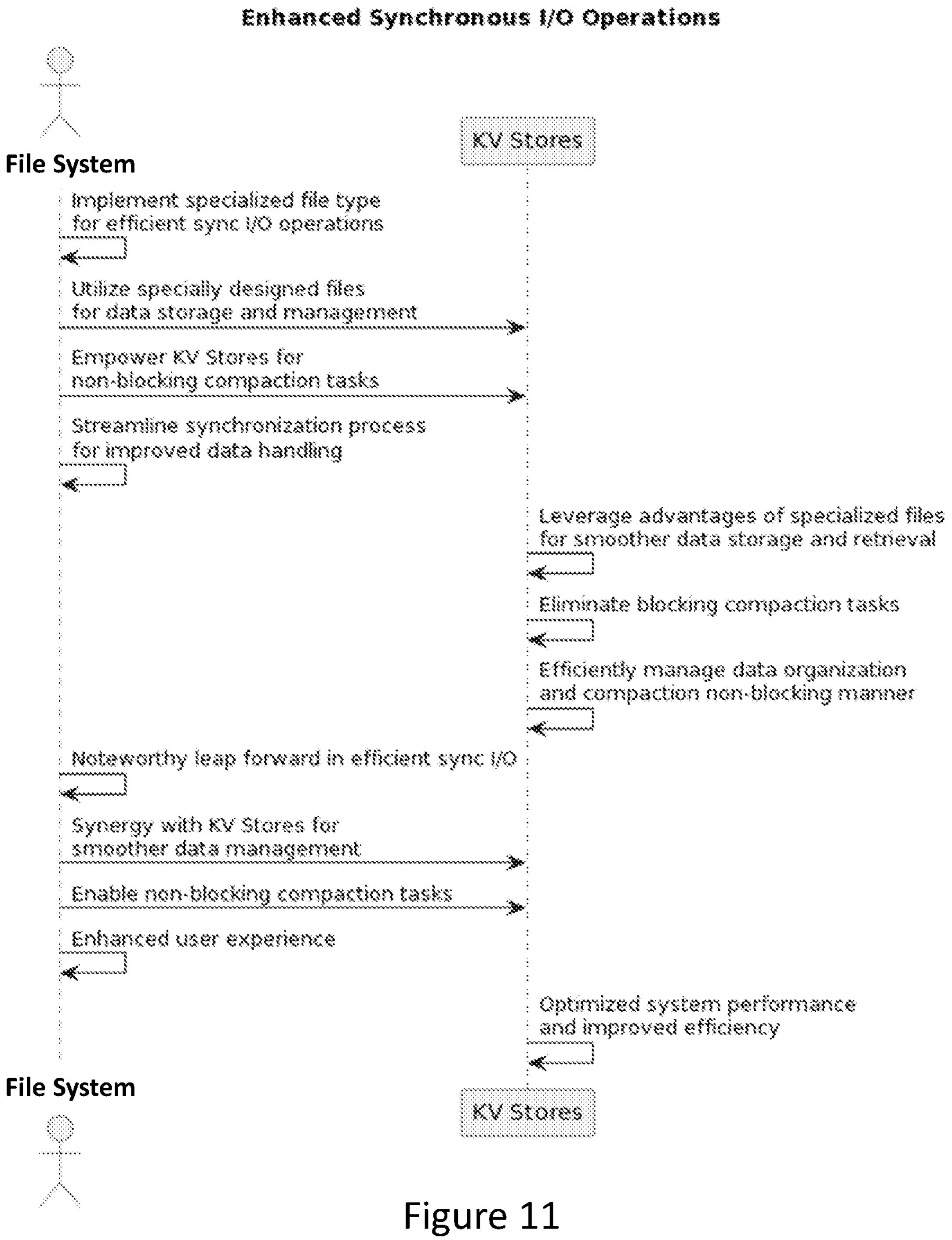
FIG. 11 shows synchronous input/output (I/O) processes in a file system according to an embodiment.

FIG. 11 shows synchronous input/output (I/O) processes in a file system according to an embodiment. For the synchronous I/O processes shown in FIG. 11, the file system (“File System” in FIG. 11) can utilize a specialized file type tailor-made to support such efficient synchronous I/O. Key-value stores (“KV Stores” in FIG. 11) working with the file system can utilize specially designed files to store and manage the data from a log engine included in the key-value system. The synchronous I/O operations such as those in FIG. 11 can improve system performance and responsiveness. The custom file type and co-design of file system and key-value store can streamline the synchronization process for input and output operations, resulting in improved data handling capabilities and ensure smoother and faster data storage and retrieval. The synchronous I/O process of FIG. 11 can be coordinated by at least part of key-value-file system collaborator 210 as shown in FIG. 2 and discussed above.

The specialized files allow the key-value stores to execute compaction tasks without causing any blockages or disruptions to the overall system performance. Traditional compaction processes can be time-consuming and often lead to system slowdowns, hindering overall performance. However, by employing the tailored file type, the key-value stores can more efficiently manage data organization and compaction in a non-blocking manner, preserving the system’s responsiveness and optimal functioning.

In order to mitigate write amplification and optimize the garbage collection process, the file system can collaborate with the key-value stores to perform garbage collection efficiently. This collaboration can include sharing zone usage information of the file system with the key-value stores, enabling informed decisions regarding file compaction or garbage collection execution. Garbage collection scheduling can be improved by considering garbage rates at the entry level, rather than just the space level. This ensures the selection of blob files with the highest garbage space, leading to more efficient garbage collection operations. Further, this awareness can allow the garbage collection process to be made more flexible, diverse, concurrent, and aware of physical capacity. This will optimize space reclamation, improve concurrency during high-water levels, and enhance overall GC performance.

Periodic compaction can be performed in the key-value stores to merge multiple layers of the same page from the log-structured merge tree into the last layer. This can reduce the amount of data handled during garbage collection, and enable upper layers to perform corresponding functions. Reduced garbage data can reduce read operations, thereby reducing read amplification in read operations. Additionally, “hot” and “cold” data can be separated through the collaboration of the file system and the key-value stores, thereby reducing write amplification issues arising from rewriting cold data due when there is mixed hot and cold data.

Figure 12:
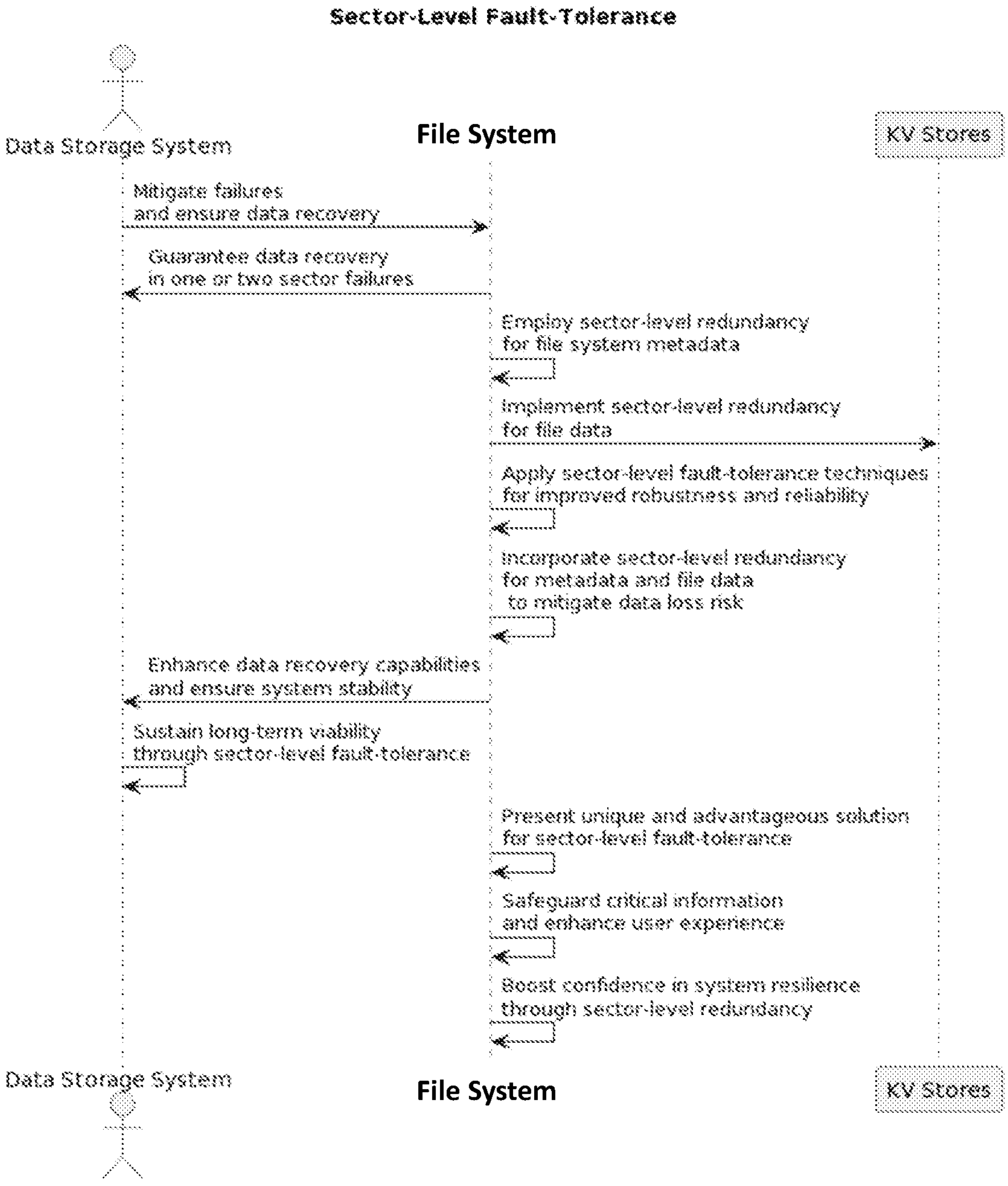
FIG. 12 shows sector-level fault tolerance in a file system according to an embodiment.

FIG. 12 shows sector-level fault tolerance in a file system according to an embodiment. FIG. 12 shows interactions between the data storage system, the file system (“File System”), and a key-value store (“KV Stores”). The file system, as shown in FIG. 12, is configured to provide sector-level redundancy for file system metadata. The structuring of the file system allows data recovery from the data storage system within one or two sector failures. In an embodiment, the key-value system is configured to provide data to the file system to achieve sector-level redundancy for the file data of the key-value stores. The sector-level redundancy can reduce the blast radius of failures, thus reducing the impact thereof. The present invention concerns a method for mitigating the potential adverse effects of failures in a data storage system, specifically aiming to reduce the extent of damage caused by such failures. In accordance with this objective, the file system provides a guarantee that data can be successfully recovered in the event of one or two sector failures. To accomplish this, a sector-level redundancy approach is employed, with the file system responsible for ensuring redundancy for the file system metadata, while the key-value stores are entrusted with implementing sector-level redundancy for the file data.

The sector-level fault-tolerance techniques improve the robustness and reliability of the data storage system. By incorporating sector-level redundancy in both the file system metadata and file data, the risk of data loss due to sector failures is substantially mitigated. Consequently, the proposed approach enhances the overall data recovery capabilities of the system, thereby contributing to its stability and long-term viability. The application of sector-level redundancy in the management of both file system metadata and file data allows safeguarding critical information, ultimately contributing to an enhanced user experience and increased system resilience.

Figure 13:
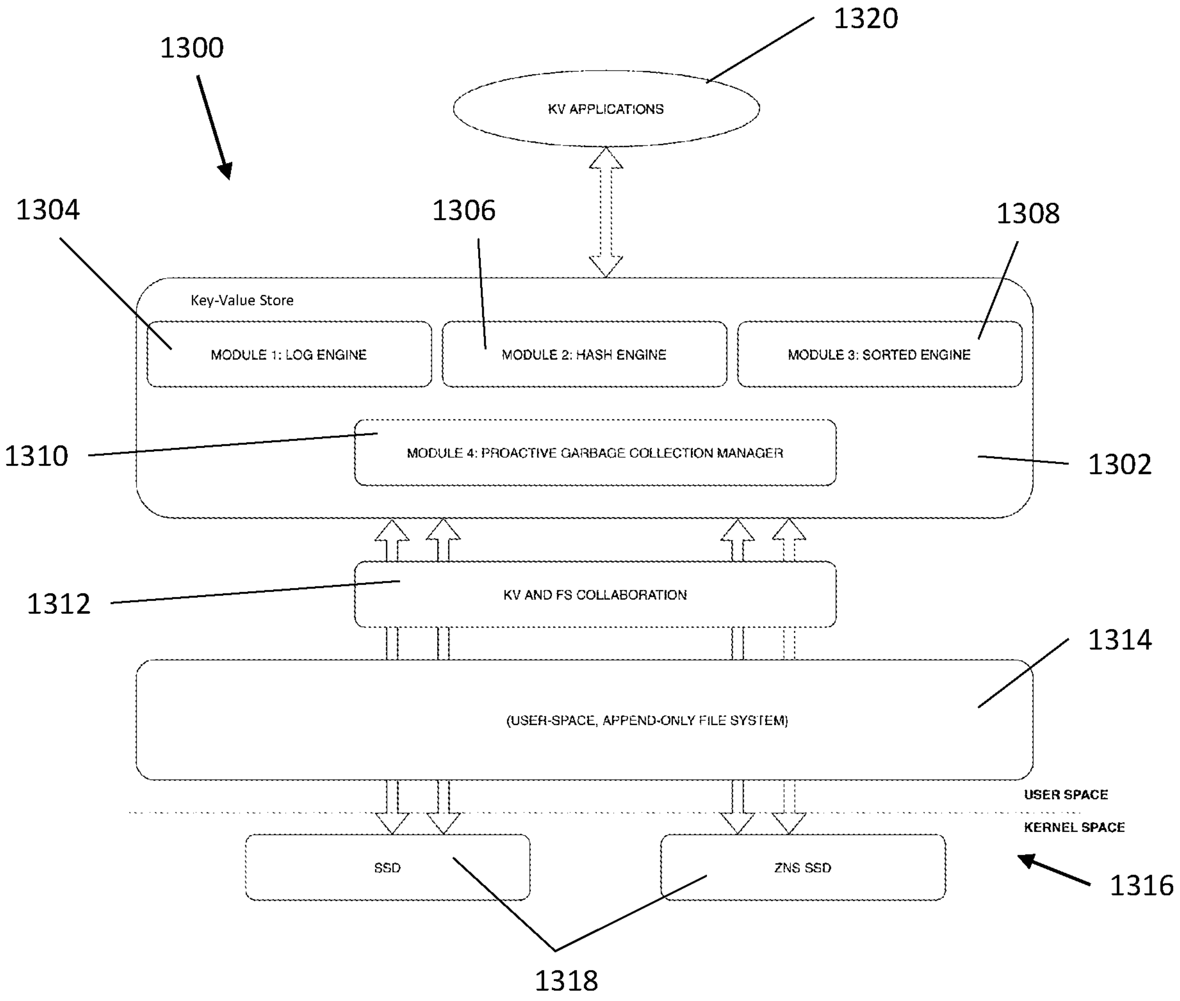
FIG. 13 shows a key-value system integrated with a file system according to an embodiment.

FIG. 13 shows a key-value system integrated with a file system according to an embodiment. Key-value store and file system 1300 includes key-value system 1302. Key-value system 1302 includes a log engine 1304, a hash engine 1306, a sorting engine 1308, and a garbage collection manager 1310. Key-value store and file system 1300 further includes a collaboration layer 1312 and file system 1314. Key-value store and file system 1300 can interact with a kernel space 1316, kernel space 1316 including one or more disks 1318. The key-value store and file system 1300 can interact with applications 1320.

Key-value and file system 1300 can be used for storage in cloud applications, for example to provide data persistence required by cloud services. Key-value system 1302 is configured to provide a key-value store, for example as part of a storage backend for cloud services. Non-limiting examples of cloud services using key-value systems 1302 include shopping, social media, metadata management, and the like. File system 1314 can be a dedicated user-level append-only file system configured to provide storage specialized to facilitate operation of key-value system 1302.

Log engine 1304 is configured to allow concurrent writing of multiple log files, thereby reducing the number of compaction and garbage collection operations. The logs written by log engine 1304 can be configured such that strong sorting is not required for handling of said logs. Log engine 1304 is configured to improve throughput performance issue in log writes and increase recovery speed by reducing the sync write overhead of logs from multiple input/output (I/O) operations to a single I/O operation, aggregating writes using a lock-free queue to control latency and improve throughput, and/or providing asynchronous interfaces to enhance the thread model. Where key-value system 1302 and file system 1314 are integrated and collaborate, the log engine 1304 can be used to store a write-ahead log (WAL) having a predefined structure having a defined actual file size. The defined file size for the WAL can in turn result in requiring fewer I/O operations, thereby enhancing performance while mitigating potential tradeoffs regarding data consistency. The operation of a log engine 1304 is further detailed in in FIGS. 4-7 and described below.

Hash engine 1306 is configured to handle point queries within the key-value system 1302. In particular, hash engine 1306 is configured to reduce tail latency in point queries. The hash engine 1306 includes separation of data and index components, and maintenance of the index in a cache memory, for example by compression of the index and/or caching of partial data. The partial data can be selected using, for example, a least recently used strategy. The operation of hash engine 1306 is further detailed in FIGS. 8 and 9 and described below.

Sorting engine 1308 is configured to carry out range scan operations while reducing the write-amplification factor and/or read/write latency associated with such operations. Sorting engine 1308 is configured to can use a partitioned log-structured merge (LSM) tree. The classification of I/O flows and scheduling of tasks can further be carried out by sorting engine 1308. The operation of a sorting engine 1308 is further detailed in FIGS. 8 and 13 and described below.

Garbage collection manger 1310 is configured to carry out garbage collection and/or compaction operations in key-value and file system 1300. The garbage collection manager 1310 can be configured to reduce unnecessary data movement during garbage collection and/or compaction operations in key-value and file system 1300. The garbage collection manager 1310 can conduct garbage collection and/or compaction operations based on awareness regarding application-side data deletion such as expiration of pages. Garbage collection and compaction carried out by garbage collection manager 1310 can be configured to arrange the data to support other modules such as sorting engine 1308. The garbage collection manager 1310 can coordinate preservation of data during the garbage collection and/or compaction operations. The operation of a garbage collection manager 1310 is further detailed in FIGS. 131-13 and described below.

Collaboration layer 1312 is configured to facilitate collaboration between key-value system 1302 and file system 1314. Collaboration layer 1312 can further facilitate efficient compaction and/or garbage collection operations in key-value system 1302 based on the collaboration between the key-value system 1302 and file system 1314. The collaboration can reduce write amplification issues arising from compaction and/or garbage collection operations. In an embodiment, the collaboration layer 1312 can expose zone usage information from key-value system 1302 to the file system 1314.

File system 1314 can be configured to split data from logs and use log-structured append-only writing as the write model, where only append operations can be performed. In an embodiment, the file system can further provide pre-allocated data space where sync writes only occur for the persistence of data, and in an embodiment, do not need to make metadata persistent. In an embodiment, the data persistence for different files and global log persistence can be executed separately. These aspects of the file system can allow the file system to avoid some metadata persistence operations, such as those caused by single data write persistence operations.

The file system 1314 can be configured to support general files and instant files. Both general and instant files can be written sequentially, and both can be read either sequentially or randomly. General files can be optimized for consistently low latency in either sequential or random reads. General files can be used for writing data in batches that do not require flushing the data to disk after each write, such as SST files. The storage space is allocated in large units, with a non-limiting example of unit size being 1 MB each. The large allocation unit can reduce metadata size for general files, such that metadata of all general files can be kept in memory during normal file system operation. By keeping the metadata in memory, no read operation to general files would require further I/O for metadata access, regardless of the read offset. This can reduce read tail latency for general files. Instant files can be optimized for fast, incremental synchronous writes while having good sequential and random read performance near the tail. Instant files can be used for writing data that requires frequent flushing to disk for instant durability, such as write-ahead log files of the key-value system. The data and metadata of each individual write can be bundled together for instant files. The bundled data and metadata can be written to a journal file shared by all instant files. The bundling of data and writing to the journal file can improve the speed of incremental write and sync operations. This approach is structured to support sequential reads, but can have tradeoffs regarding random reads. Since instant files are expected to be mostly read sequentially, with random reads mostly concentrated near the tail most recently written data of each instant file that is actively being written can be cached to improve read performance.

The file system 1314 can include a user-space I/O scheduler to assign I/O priority to different I/O types. The I/O scheduler will mark foreground I/O as high priority while background I/O will be marked as low priority. In addition, the key-value system 1302 can include a scheduler to schedule its background tasks in order to ensure that each I/O issued by the upper layer applications has a consistent I/O amplification. Through this co-design of I/O scheduling in both key-value system 1302 and file system 1314, the tail latency can be kept stable and low as both the I/O amplification and I/O latency are consistent. Moreover, reading general files from the file system requires no I/O for metadata, and use of large spaces for the general files can ensure that most read operations require a single I/O.

Kernel space 1316 can contain disks 1318. Disks 1318 can include one or more storage media, such as solid state drives (SSDs). In an embodiment, at least some of disks 1318 are zoned storage (ZNS) SSDs.

Applications 1320 are any suitable applications utilizing the key-value and file system 1300, for example, online shopping, social media, metadata management applications, or the like. The applications 1320 can interface with key-vale and file system 1300 through any suitable application programming interface (API). In an embodiment, the API can be specific for the particular type of file, for example having the nature of the files as general files or instant filed be determined by the API through which the file has been received.

ASPECTS

Aspect 1. A file system, wherein the file system is configured to perform log-structured append-only write operations, the file system configured for use with a key-value store, the file system comprising a file manager configured to maintain separation of data and logs.

Aspect 2. The file system according to aspect 1, wherein the file manager is further configured to determine whether a file is a general file or an instant file based on write characteristics of said file, and when the file is a general file, to store the general file in one or more pre-allocated data spaces.

Aspect 3. The file system according to aspect 2, wherein the one or more pre-allocated data spaces are each approximately one megabyte (MB) in size.

Aspect 4. The file system according to any of aspects 1-3, further comprising a metadata manager configured to perform compaction of a journal file, the journal file containing persistent metadata of the file system.

Aspect 5. The file system according to aspect 4, wherein the compaction of the journal file is performed in a synchronous mode, wherein in the synchronous mode, a global flushing lock is maintained until a compacted journal and updates to a superblock are completed.

Aspect 6. The file system according to aspect 4, wherein the compaction of the journal file is performed in an asynchronous mode, wherein in the asynchronous mode, a global flushing lock is released once in-memory metadata dump requests are submitted.

Aspect 7. The file system according to any of aspects 1-6, further comprising a task scheduler configured to assign a priority to each write task, the priority based on whether the data of the write task is general data or instant data.

Aspect 8. The file system according to any of aspects 1-7, comprising a dedicated journaling thread configured to generate a journal, wherein the journal includes a most recent checkpoint from an operation log of the file system.

Aspect 9. The file system according to aspect 8, wherein the journal includes one or more transactions, each of the one or more transactions including a universal unique identifier, a global sequence identifier, an encoded operation log entry, and a cyclic redundancy check.

Aspect 10. The file system according to any of aspects 1-9, wherein a disk layout of the file system includes a superblock, the superblock including journal index node content, universal unique identifier data, version information, and block size.

Aspect 11. The file system according to aspect 10, wherein the disk layout provides the superblock at a second 4 kilobyte block provided in a storage device.

Aspect 13. The file system according to any of aspects 1-12, wherein data storage of the file system includes one or more zoned solid state drives (ZNS SSDs).

Aspect 14. A system comprising the key-value store and the file system according to any of aspects 1-13.

Aspect 15. The system according to aspect 14, wherein the file system is configured to update data based on the key-value store without updating metadata associated with said data.

Aspect 16. The system according to any of aspects 14-15, comprising a key-value store and file system collaborator configured to provide an interface between the key-value store and the file system.

Aspect 17. The system according to aspect 16, wherein the key-value store and file system collaborator is configured to expose an application programming interface allowing the key-value store to mark priority of input/output requests to the file system.

Aspect 18. The system according to any of aspects 16-17, wherein the key-value store and file system collaborator is configured to coordinate compaction and/or garbage collection operations between the key-value store and the file system.

Aspect 19. The system according to any of aspects 16-18, wherein the key-value store and file system collaborator is configured to provide data from the key-value store to the file system to achieve sector-level redundancy for the file data of the key-value store in the file system.

Aspect 20. The system according to any of aspects 16-19, wherein the key-value store and file system collaborator is configured to perform sync operations for the key-value store and the file system without requiring syncing of metadata.

Aspect 21. The system according to any of aspects 1-20, wherein the file system is an append-only file system.

Aspect 22. The system according to any of aspects 1-20, wherein the file system is configured to write said separate data and logs to persistent memory independently.

Aspect 23. A database system, comprising a key-value store, a file system configured to perform log-structured append-only write operations, the file system configured for use with a key-value store, and a key-value store and file system collaborator configured to provide an interface between the key-value store and the file system, wherein the file system comprises a file manager configured to maintain separation of data and logs.

Aspect 24. The database system according to aspect 23, wherein the key-value store and file system collaborator is configured to expose an application programming interface allowing the key-value store to mark priority of input/output requests to the file system.

Aspect 25. A computer-readable medium containing instructions that, when executed by a processor, direct the establishment and operation of a file system, the file system configured to perform log-structured append-only write operations, the file system configured for use with a key-value store, the file system comprising a file manager configured to maintain separation of data and logs.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A system comprising:

at least one processor; and at least one computer-readable medium containing instructions which, when executed, cause the at least one processor to perform operations comprising:

maintaining separation of data and logs within a file system, wherein a disk layout of the file system includes a superblock, the superblock including journal index node content, universal unique identifier data, version information, and block size, and wherein the disk layout comprises a journal file and the data, distinct from the superblock, wherein the journal file comprises information capturing a most recent checkpoint from an operation log of the file system, and the data stores content of individual files within the file system;

pre-allocating one or more chunks of storage space for the data into hierarchical lavers comprising an L0 layer indicating a status of each allocation unit (AU) in the chunks of storage space, and a second layer L1 that groups bits in the L0 layer to a group size that comprises the same number of bits as a CPU cache line size;

writing the data into the one or more chunks of storage space without requiring a corresponding update to metadata;

persisting the data; and persisting logs separately from the persisted data.

2. The system of claim 1, the operations comprising: determining whether a file is a general file or an instant file based on write characteristics of the file, and in response to determining that the file is a general file, storing the general file in one or more pre-allocated data spaces.

3. The system of claim 1, further comprising a metadata manager configured to perform operations comprising compaction of the journal file, the journal file containing persistent metadata of the file system.

4. The system of claim 3, wherein the compaction of the journal file is performed in a synchronous mode, wherein in the synchronous mode, a global flushing lock is maintained until a compacted journal and updates to the superblock are completed.

5. The system of claim 3, wherein the compaction of the journal file is performed in an asynchronous mode, wherein in the asynchronous mode, a global flushing lock is released once in-memory metadata dump requests are submitted.

6. The system of claim 1, wherein the operations comprise a dedicated journaling thread configured to generate the journal file, wherein the journal file includes a most recent checkpoint from an operation log of the file system.

7. The system of claim 6, wherein the journal file includes one or more transactions, each of the one or more transactions including a universal unique identifier, a global sequence identifier, an encoded operation log entry, and a cyclic redundancy check.

8. The system of claim 1, wherein the disk layout provides the superblock at a second 4 kilobyte block immediately following a first 4 kilobyte block provided in the storage space.

9. The system of claim 1, wherein data storage of the file system includes one or more zoned solid state drives (ZNS SSDs).

10. A system comprising:

at least one processor;

a key-value store; and at least one computer-readable medium containing instructions which, when executed, cause the at least one processor to perform operations comprising:

maintaining separation of data and logs within a file system, wherein a disk layout of the file system includes a superblock, the superblock including journal index node content, universal unique identifier data, version information, and block size, and wherein the disk layout comprises a journal file and the data, distinct from the superblock, wherein the journal file comprises information capturing a most recent checkpoint from an operation log of the file system, and the data stores content of individual files within the file system;

pre-allocating one or more chunks of storage space for the data into hierarchical layers comprising an L0 layer indicating a status of each allocation unit (AU) in the chunks of storage space, and a second layer L1 that groups bits in the L0 layer to a group size that comprises the same number of bits as a CPU cache line size;

writing the data into the one or more chunks of storage space without requiring a corresponding update to metadata;

persisting the data; and persisting logs separately from the persisted data.

11. The system of claim 10, wherein the operations comprise updating update data in the file system based on the key-value store without updating metadata associated with the data.

12. The system of claim 10, comprising a file system collaborator configured to perform operations comprising providing an interface between the key-value store and the file system.

13. The system of claim 12, wherein the key-value store and file system collaborator are configured to expose an application programming interface allowing the key-value store to mark priority of input/output requests to the file system.

14. The system of claim 12, wherein the key-value store and file system collaborator are configured to coordinate compaction and/or garbage collection operations between the key-value store and the file system.

15. The system of claim 12, wherein the key-value store and file system collaborator are configured to provide data from the key-value store to the file system to achieve sector-level redundancy for file data of the key-value store in the file system.

16. The system of claim 15, wherein the key-value store and file system collaborator are configured to perform syne operations for the key-value store and the file system without requiring syncing of metadata.

17. The system of claim 1, comprising a key-value store and a file system collaborator, wherein the key-value store and file system collaborator are configured to expose an application programming interface allowing the key-value store to mark priority of input/output requests to the file system.

18. A non-transitory computer-readable medium containing instructions that, when executed by a processor, direct establishment and operation of a file system, the file system configured to perform append operations, the file system configured for use with a key-value store, wherein the file system comprises a file manager configured to:

maintain separation of data and logs within the file system, wherein a disk layout of the file system includes a superblock, the superblock including journal index node content, universal unique identifier data, version information, and block size, and wherein the disk layout comprises a journal file and the data, distinct from the superblock, wherein the journal file comprises information capturing a most recent checkpoint from an operation log of the file system, and the data stores content of individual files within the file system;

pre-allocate one or more chunks of storage space for the data into hierarchical layers comprising an L0 layer indicating a status of each allocation unit (AU) in the chunks of storage space, and a second layer L1 that groups bits in the L0 layer to a group size that comprises the same number of bits as a CPU cache line size;

write the data into the one or more chunks of storage space without requiring a corresponding update to metadata;

persist the data; and persist logs separately from the persisted data.

* * * * *